United States Patent [19]

Haughey et al.

[11] 4,399,633

[45] Aug. 23, 1983

[54] PRODUCTION OF ALKALI METAL OR ALKALINE EARTH METAL PEROXIDES

[75] Inventors: Douglas P. Haughey, Chester; Malcolm H. Millar, Liverpool, both of England

[73] Assignee: Interox Chemicals Limited, London, England

[21] Appl. No.: 252,323

[22] Filed: Apr. 9, 1981

[51] Int. Cl.³ .............................................. C01D 1/02

[52] U.S. Cl. .......................................... 47/57.6; 34/9; 34/10; 34/11; 71/63; 71/77; 423/582; 423/583; 423/265

[58] Field of Search ...................... 423/582, 583; 34/9, 34/10, 11; 71/63, 64.03, 904, 77; 47/57.6; 119/1

[56] References Cited

U.S. PATENT DOCUMENTS

| | | | |
|---|---|---|---|
| 1,308,942 | 7/1919 | French | 34/11 |
| 2,290,862 | 7/1942 | Canning | 423/583 |
| 2,350,162 | 5/1944 | Gordon | 34/11 |
| 2,357,655 | 9/1944 | Hummel et al. | 423/583 |
| 2,533,660 | 12/1950 | Young | 423/583 |
| 2,783,544 | 3/1957 | Bachmann et al. | 34/10 |
| 3,151,951 | 10/1964 | Reid et al. | 34/9 |
| 3,386,182 | 6/1968 | Lippert | 34/10 |
| 3,464,121 | 9/1969 | Fukada et al. | 34/10 |
| 3,475,132 | 10/1969 | Seifert et al. | 34/10 |
| 3,786,573 | 1/1974 | Scheppe et al. | 34/10 |
| 3,789,513 | 2/1974 | Mark | 34/10 |
| 3,879,856 | 4/1975 | Barr | 34/10 |

FOREIGN PATENT DOCUMENTS

| | | | |
|---|---|---|---|
| 52-69711 | 6/1977 | Japan | 47/57.6 |
| 799251 | 8/1958 | United Kingdom | 34/11 |

OTHER PUBLICATIONS

Perry, *Chemical Engineers' Handbook*, Third Edition, McGraw-Hill Book Co., Inc. (1950), pp. 834–838.

*Primary Examiner*—O. R. Vertiz
*Assistant Examiner*—Wayne A. Langel
*Attorney, Agent, or Firm*—Larson and Taylor

[57] ABSTRACT

Alkali metal or alkaline earth metal peroxides, for example, particularly, calcium peroxide, are produced by recovering a moist peroxide product from an aqueous mixture, formed by reacting hydrogen peroxide and a hydroxide or oxide of the alkali metal or alkaline earth metal, and drying the moist product by means of a pneumatic conveyer drier. The peroxide so produced is suitable for granulation. Alternatively, particulate substances, such as seed, are coated with the peroxide by blending with the moist peroxide product and passing the blend through the pneumatic conveyer drier.

12 Claims, No Drawings

PRODUCTION OF ALKALI METAL OR ALKALINE EARTH METAL PEROXIDES

This invention relates to the production of alkali metal or alkaline earth metal peroxides such as, for example, calcium peroxide.

Alkali metal or alkaline earth metal peroxides have utility as sources of oxygen in a wide range of applications amongst which are chemical processing technology, agriculture, water treatment and medicine. The useable oxygen content of such compounds is referred to as "active oxygen."

Depending on the particular application envisaged alkali metal or alkaline earth metal peroxides may be required in a variety of physical forms. They may be required in finely divided form for dispersion throughout a solid or liquid medium or throughout another particulate solid. Calcium peroxide, for example, may be required to be finely dispersed throughout a resin mix for use as a source of oxygen in the curing of polysulphide rubbers, or may be required in the form of a ball or granule for use in the soil as a long lasting source of oxygen for the encouragement of plant growth, or may be required in the form of a coating adhering to the outside of a seed for the encouragement of germination.

Alkali metal or alkaline earth metal peroxides may be prepared by reacting hydrogen peroxide and a hydroxide or oxide of the alkali metal or alkaline earth metal in an aqueous medium. The peroxide may be recovered from the aqueous medium by means of a centrifuge and may then be tray-dried. The tray-drying procedure is time consuming labour intensive, and not particularly suitable for high production rates. Due to the particular duration/temperature relationship involved tray-drying may often involve an undue loss of active oxygen. The tray dried peroxide product is highly and randomly aggregated and requires milling to produce a consistent finely divided dry product.

The milled tray-dried product may still not be directly usable for some applications. For use as a seed coating it requires separate compounding with other ingredients such as fillers and binding agents and may require a degree of wetting thereby wasting a proportion of the energy used in the tray-drying stage.

It has also been found that some finely divided alkali metal or alkaline earth metal peroxides, such as, for example calcium peroxide, are not suited to granulation or balling procedures. It is thought that this may be due to an undue uniformity of particle size where, for example, all, or nearly all, of the particles may be within a 10 micron range.

The present invention relates to a new or improved means of treating moist alkali metal or alkaline earth metal peroxides recovered, for example as centrifuge or filter product, from an aqueous reaction mixture. The invention provides a finely divided product suitable for granulation, and also provides a method for coating particulate substances such as seeds without a separate coating step. The invention provides a process for the preparation of an alkali metal or an alkaline earth metal peroxide by reacting hydrogen peroxide and a hydroxide or oxide of the alkali metal or alkaline earth metal in an aqueous medium and separating the peroxide from the aqueous medium in the form of a moist peroxide product characterised in that the moist peroxide product is dried by means of a pneumatic conveyor drier.

By a pneumatic conveyor drier is meant a drier in which solids to be dried are conveyed along a duct, or through a chamber or chambers, entrained in a stream of hot gas, usually air which may contain combustion products, and the resulting dried solids are thereafter separated from the moisture-laden gas. The word "entrained" is used to denote that the solids are, at least for a time, supported against gravity by the air flow within the duct, chamber or chambers.

Pneumatic conveyer driers may, generally, be classified into three types.

(a) Simple pneumatic conveyer driers in which the solids are conveyed in one or more passes, usually upwardly, through a duct.

(b) Pneumatic conveyor driers incorporating a delay chamber or chambers. The chambers are, usually, used in combination with a duct or ducts and are, usually, of the cyclone type in which the solids are conveyed in a circular or helical path about the inner circumference thereof so as to lengthen the residence time of the solids in the the drier.

(c) Pneumatic conveyor driers of the ring drier type incorporating partial recycle of the air and entrained solids in a ring duct.

Any of the above types of conveyer drier may be used in the practice of this invention. Preferably a type (b) drier is used modified, if required to provide recycle of a proportion of the dried material.

It is an advantageous feature this invention that the formation of the alkali metal or alkaline earth metal peroxide be carried out batchwise thereby avoiding the need for continual and precise monitoring of the rates of addition of the reactants. Suitably, at least two separate batch reactions may be carried out alternately thereby enabling a substantially continuous stream of product to be produced. Alternatively, a single batch reactor may be used in combination with a holding tank to obtain a similar effect. This alternative is preferred since the control system required is simpler and the resulting delay tends to encourage more complete reaction.

In the carrying out of the formation of the alkali metal or alkaline earth metal peroxide the aqueous hydrogen peroxide is, suitably, mixed with an aqueous suspension of the alkali metal or alkaline earth metal oxide or hydroxide in suitable proportions and the resulting aqueous reaction mixture is, suitably, maintained until the reaction is complete or has proceeded to the desired extent. Preferably the aqueous hydrogen peroxide is added to an aqueous suspension of the oxide or hydroxide, agitation being maintained during the addition and while the reaction is proceeding. Normal commercial grades of reactants may be used. The concentration of the hydrogen peroxide is, preferably, from 30% to 70% by weight, particularly preferably from 35% to 65% by weight. The water used to form the reaction medium is, preferably, recycled centrate or demineralised water. Preferably, the temperature of the dispersion is maintained at below 65° C. and, particularly preferably, not above 60° C. Preferably, the temperature of the dispersion is maintained at above 35° C., and, particularly preferably at, at least, 40° C. The quantity hydrogen peroxide is preferably at least 0.7 times stoichiometric quantity and, preferably, is not more than 1.5 times the stoichiometric quantity.

Additives normally employed in the manufacture of alkali metal or alkaline earth metal peroxides may be introduced into the aqueous reaction medium as required.

Preferably, the moist peroxide product produced according to the invention is obtained by subjecting the reaction mixture to centrifugation or filtration preferably to a residual moisture content of from 10% to 45% by weight.

The aqueous medium resulting from the reaction is preferably passed, without any substantial cooling, to the centrifuge which is, preferably, a centrifuge capable of handling a continuous input. One suitable type of centrifuge is a solid bowl decanter centrifuge. Preferably, the moist peroxide product has a moisture content of not more than 40% particularly preferably not more than 35% by weight and such a moisture content is readily obtained by means of a centrifuge. Centrifuge liquor may contain small quantities of residual reactants and unseparated products and is, preferably, recycled to form the aqueous reaction medium, additional water being added to it as required. Alternatively, any excess liquor, may be discharged to waste.

It is a particularly advantageous feature of the present invention that the moist peroxide product, for example the centrifuge product, may be mixed with various substances before being dried. Pneumatic conveyor driers are, generally, equipped with means for the dispersion of the moist product to be dried in the conveying gas and, with mixing means for the blending in of recycled dried product with moist solid to be dried.

It may be necessary to blend alkali metal or alkaline earth metal peroxides with particulate solid substances, for example fillers such as, for example, calcium carbonate or fertilisers such as, for example, nitrogenous materials. Alternatively, or additionally, it may be necessary to coat seed with the peroxide product or to granulate, or ball, the peroxide product.

The addition of solid substances before drying the moist peroxide product according to the invention is particularly advantageous in that (a) it avoids a separate blending step which might have to be accompanied by moistening of the already dried product and (b) it controls the moisture content of the moist peroxide product so as to produce a material particularly suited for input into a pneumatic conveyor drier.

The dried peroxide product is particularly suitable for granulation, or balling.

A proportion of already dried peroxide product may be blended back into the moist peroxide product.

According to a further feature of this invention seed to be coated with an alkali metal or alkaline earth metal peroxide is blended with the moist peroxide product and with any such other substances as may be appropriate and the blend of seed and moist peroxide product is passed through the pneumatic conveyer drier. This is a particularly simple means of achieving seed coating. Seed of rice, wheat, barley, maize or other cereal crops, of legume such as, for example, clover, alfafa, lupins, soya and ground nut, and of vegetables such as, for example onion, carrot, celery and tomato are, suitably, coated by such means.

Preferably, the moist peroxide product, after blending with any added substance, has a moisture content of not more than 40% by weight, particularly preferably not more than 35% by weight but sufficient to provide adequate adhesion between the moist peroxide product and the added substance where such is required as, for example, where the added substance is seed to be coated with the moist peroxide product; for example a moisture content of at least 15%.

For the purpose of calculating the moisture content of the moist peroxide product, or the final product, moisture which is inaccessible to the drying action by virtue of the inherent nature of the added substance is ignored. On this basis the internal moisture content of seed is considered, herein, to be nil.

The pneumatic conveyor drier is operated with an inlet air temperature of, preferably, at least 150° C. and, preferably, not more than 550° C., particularly preferably not more than 400° C. The residence time in the pneumatic conveyor drier is preferably the minimum required to produce adequate drying for example at least 1 second very suitably at least 2 seconds, and is, preferably not more than 20 seconds to give a product containing preferably less than 0.5% moisture.

Preferably the invention is applied to the production of calcium peroxide utilising, preferably, commercial grade lime (calcium hydroxide) as a reactant. A suitable grade of lime is Standard LIMBUX (Trade Name) containing not more than about 800 ppm iron, as $Fe_2O_3$, manufactured by Imperial Chemical Industries Limited.

The invention will now be illustrated by means of the following example of the production of calcium peroxide.

EXAMPLE

A calcium peroxide slurry was prepared in 10 separate batches in a stirred tank reactor operating at 60° C. In each batch a lime slurry was initially prepared in the reactor by the addition of 5.4 kg ICI Standard Limbux $Ca(OH)_2$ to 9.9 kg demineralised water and 5.0 kg 50% by weight $H_2O_2$ was then pumped continuously into the reactor over a period of 19 min. Following completion of each batch reaction, 80 ml 79.5 Tw sodium silicate were added to the slurry. The calcium peroxide slurries so produced were bulked to give an average solids content of 28.7% and an average $CaO_2$ content of 78% on a wet cake/dry weight basis. The bulked slurry, at 50° C., was fed continuously to a Broadbent decanter centrifuge and gave a solid cake with a 38.8% by weight moisture content and a centrate liquor containing 0.3% by weight of solids. The weights of recovered cake and centrate were 82.8 kg and 96.8 kg respectively.

An APV thermoventuri flash drier was operated continuously at an inlet air temperature of 250° C. and an outlet air temperature of 90° C. Direct fired heating of the air was used. Moist solid peroxide product obtained from the centrifuge was backmixed with already dried product to give an average moisture content of about 26% by weight and was dispersed into the drier air stream. The dry peroxide obtained comprised 75% $CaO_2$ and 0.12% moisture and was in the form of a fine particle size powder which gave a satisfactory performance in both granulation and seed coating.

We claim:

1. A process for the preparation of an alkali metal or an alkaline earth metal peroxide comprising reacting hydrogen peroxide and a hydroxide or oxide of the alkali metal or alkaline earth metal in an aqueous medium, separating the peroxide from the aqueous medium in the form of a moist peroxide product, and drying the moist peroxide product by means of a direct fired pneumatic conveyor drier, said moist peroxide having a moisture content of from 10% to 45% by weight, and said drier being operated at an air inlet temperature of at least 150° C.

2. A process as claimed in claim 1 wherein the moisture content of the moist peroxide product is at least in part controlled by the addition of already dry material.

3. A process as claimed in claim 2 wherein the already dry material consists of or includes material other than recycled previously dried alkali metal or alkaline earth metal peroxide.

4. A process as claimed in claim 3 wherein the already dry material comprises one or more fillers for the alkali metal or alkaline earth metal peroxide or one or more fertilisers or seed.

5. A process as claimed in claim 1 wherein moist peroxide product has a moisture content of not more than 35% by weight.

6. A process as claimed in claim 5 wherein the moist peroxide product has a moisture content of from 15% to 35% by weight.

7. A process as claimed in claim 1 wherein the pneumatic conveyer drier is operated at an inlet air temperature of up to 550° C. and to give a residence time of at least 1 second.

8. A process as claimed in claim 7 wherein the pneumatic conveyor drier includes one or more delay chambers so as to give a residence time of at least 2 seconds.

9. A process as claimed in claim 1 wherein the moist peroxide product is produced by centrifugation or filtration of the peroxide-containing aqueous medium.

10. A process as claimed in claim 1 wherein the dried alkali metal or alkaline earth metal peroxide has a moisture content of less than 0.5% by weight.

11. A process as claimed in claim 1 wherein the alkali metal or alkaline earth metal peroxide is calcium peroxide.

12. A process as claimed in claim 1 wherein the pneumatic conveyer drier is operated at an inlet temperature of at least 150° C., wherein the residence time in said drier is from 1 to 20 seconds, and wherein the dried product has a moisture content of less than 0.5%.

* * * * *